Patented Feb. 6, 1951

2,540,981

UNITED STATES PATENT OFFICE 2,540,981

NONELECTROSTATIC PLASTIC MATERIALS

John B. Eisen, Waterloo, Wis., assignor to Monsanto Chemical Company, St. Louis, Mo., a corporation of Delaware No Drawing. Application January 4, 1950,
Serial No. 136,843

14 Claims. (Cl. 260—30.8)

This invention relates to synthetic resin molding materials, and more specifically to such molding materials which are substantially non-susceptible to the accumulation of electrostatic charges and to a method for eliminating the highly undesirable effects of electrostatic charges which build up on synthetic resin articles, more particularly articles comprising synthetic resins such as polyvinyl chloride, polystyrene or copolymers of either which are particularly susceptible to acquiring electrostatic charge.

Fibers, films, sheets and other articles made of such polymers have been particularly subject to the objectionable characteristics resulting from high electrostatic susceptibility. As a result of such susceptibility, these articles accumulate electrostatic charges which attract dust, lint, tobacco ashes, and like materials and cause such particles to cling tenaciously to the articles. In the case of fibers, for example, a fiber composed of a synthetic resin having a high electrostatic susceptibility clings to guides and rolls of textile machinery and is damaged or seriously weakened if not satisfactorily treated to eliminate electrostatic charges.

Prior to this time, no method for eliminating these defects has been described which will remain effective over an indefinite period of time, or which constitutes more than a temporary treatment, or which is independent of the ambient humidity. The methods of the prior art depend on the property of directly wetting the synthetic resin articles with an aqueous material or upon the property of deliquescence to cause the material to be so wetted. Such materials include glycols, glycerine, sorbitol, sulfonates, and the materials disclosed in U. S. Patent 2,403,960. These treatments produce only a temporary absence of electrostatic charge; the length of time during which the treatment remains effective being dependent on the ambient humidity. In dry climates the duration is very short. The effectiveness of such treatments may be renewed by wiping with a wet cloth or otherwise wetting the article but such re-treatment remains effective only until the water evaporates. For example, an article which has been treated by such a method, and then allowed to remain in a paper container such as an envelope, until dry, acquires an electrostatic charge from friction with the paper upon merely being removed from such a container.

My invention, on the other hand, provides substantially permanent freedom from the disadvantages of electrostatic charges. This invention does not in any way depend on wetting the molded article with aqueous or deliquescent substances and therefore produces results substantially independent of humidity. A further advantage of my invention over the prior art is that it makes possible the production of electrostatically non-susceptible articles directly by the molding in a single operation instead of being restricted to methods of subsequent treatment.

An object of this invention is therefore to provide a method for eliminating the effects of electrostatic charges on synthetic resin articles.

Another object is to provide articles comprising synthetic resins which are free of the effects of electrostatic charges.

Another object is to provide a method of substantially permanently making synthetic resin articles free from the effects of electrostatic charges.

Another object is a plastic material in which the tendency to build up static surface charges is largely reduced and even completely eliminated.

Another object is a new plastic composition.

Another object is novel means to reduce the static charges in objects made by injection molding processes.

Further objects and advantages of this invention will become apparent as the following detailed description proceeds.

In accordance with my invention, I incorporate in a molding powder which may comprise any resinous polymer susceptible to accumulation of an electrostatic charge, 0.1 to 10.0 percent of a cycloaliphatic amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

The incorporation may be accomplished by any of the methods known to the prior art, such as by adding the amine sulfate to the powder either directly or in solution and by mixing, either stirring, tumbling or by co-extruding and subsequently grinding the ingredients. Articles made from such molding powder are found to accumulate substantially no electrostatic charges, even after vigorous rubbing with woolen or cotton cloth.

The invention is further illustrated by the following specific examples, which are given by way of illustration only and are not in any sense to be construed by way of limitation.

Example I

Polystyrene granules having an average molecular weight of 25,000 and an average diameter of a quarter inch were tumbled with a mixture of ½ percent of diethylcyclohexylamine salt of lauryl sulfate, and ½ percent of polyethylene glycol ether, having an average molecular weight of 400. The resulting material was extruded to mix the components thoroughly and was then molded in an injection molding machine at 325° F. The articles thus produced were tested and were proven to be substantially free from electrostatic charge, as expressed by lack of attraction for fine particles of dust, pulverized cigarette ashes and other similar non-conducting particles. The effectiveness of the composition was confirmed over a period of 6 months.

Example II

One part of diethylcyclohexylamine salt of decyl sulfate was incorporated with 99 parts of polystyrene molding powder by mixing the materials and then passing them through an extruder to secure intimate mixture and the resulting composition was injection molded at 350° F. with a cycle of 11 seconds and a mold temperature of 180° F. The resultant moldings were determined to have substantially no electrostatic charge, as measured with an electronic voltmeter. The effectiveness of the material was confirmed over a period of 6 months.

Example III

To 99.25 parts polystyrene molding powder were added 0.75 parts methyl-butyl cyclohexylamine octadecyl sulfate. The ingredients were mixed as in Example I. The resultant product was comminuted and was then molded in a compression molding press at 210° F. The article thus molded was tested for electrostatic charge and was found to be non-static; it remained so throughout a six-month period.

Example IV

To 98.5 parts of polyamide resin flake were added 1.5 parts of diethylcyclohexylamine salt of lauryl sulfate. The ingredients were tumbled one hour prior to injection molding at 250° F. The resultant disks were tested for electrostatic susceptibility and found to be inert; this protection was observed to be essentially unchanged in periodic tests over five months.

Example V

Polystyrene granules having an average molecular weight of 20,000 and an average diameter of a quarter inch were tumbled with a mixture of 4.5 percent of dipropylcyclohexylamine salt of benzyl sulfate and 0.5 percent of polyethylene glycol ether having an average molecular weight of 400. The resulting material was extruded to mix the components thoroughly and was then molded in an injection molding machine at 250° F. with a mold temperature of 100° F. The articles thus produced were tested to determine their susceptibility to becoming electrostatically charged by rubbing vigorously with a wool cloth and then observing the amount of attractive force exerted on lint, dust and pulverized cigarette ashes. No effects of the presence of an electrostatic charge could be observed. The effectiveness of the treatment was unimpaired after 6 months.

Example VI

To 97 parts of molding powder comprising a copolymer of 88 percent vinyl chloride and 12 percent vinyl acetate were added 3 parts of decahydronaphthyldiethylamine salt of hexadecyl sulfate. The mixture was thoroughly intermingled by tumbling and was then molded into small blocks in an injection molding machine. The resultant articles were found to have substantially no electrostatic charge after being rubbed vigorously with a wool cloth. Testing was continued at monthly intervals and the absence of any electrostatic charge continued to be indicated through a 6 month period.

Example VII

To 90 parts of cellulose acetate butyrate molding powder were added 10 parts of ethylisopropylcyclohexylamine salt of octyl sulfate. The mixture was thoroughly intermingled by tumbling and extruding and was then molded into small blocks in an injection molding machine. The resultant articles were found to be substantially free from electrostatic charge after being rubbed vigorously with a wool cloth. Testing was continued at monthly intervals and the absence of any electrostatic charge confirmed through a 6 month period.

Example VIII

To 99.9 parts of polymethylmethacrylate molding powder was added 0.1 part of diethylcyclohexylamine salt of furfuryl sulfate. The mixture was thoroughly intermingled by tumbling and extruding and was then molded into small articles in an injection molding machine. The resultant articles were found to be substantially free from electrostatic charge after being rubbed vigorously with a wool cloth. Testing was continued at monthly intervals and the absence of any electrostatic charge confirmed through a 5 month period.

Example IX

To 98 parts of polyethylene molding powder were added 2 parts of tetrahydronaphthyldiethylamine salt of lauryl sulfate. The mixture was thoroughly intermingled by tumbling and extruding and was then molded into small articles in an injection molding machine. The resultant articles were found to have substantially no electrostatic charge after being rubbed vigorously with a wool cloth. Testing was continued at monthly intervals and the absence of any electrostatic charge confirmed throughout a 6 month period.

Example X

To 99.5 parts of a copolymer consisting of 92 parts acrylonitrile and 8 parts vinyl acetate, was added 0.5 part of diethylcyclohexylamine salt of lauryl sulfate. The ingredients were comminuted, thoroughly mixed in an extruder at 285° F., and then compression molded at the same temperature. The molded articles showed no electrostatic susceptibility during periodic tests over four months.

Example XI

To 98.5 parts of polystyrene molding powder were added 1.5 parts of dimethyl cyclopentylamine salt of furfuryl sulfate. The well-mixed ingredients were injection molded at 310° F. The molded objects showed no electrostatic susceptibility during periodic tests over four months.

The above examples by no means exhaust the different possible applications of my invention. They have been shown by way of illustration only and not in any sense by way of limitation.

It is to be understood that the invention is capable of considerable variation without deviation from its major aspects. Although the examples have shown the use of a number of cycloaliphatic amine salts of alcohol sulfates as being operative in my invention, other cycloaliphatic amine sulfates can be used which have at least one alicyclic radical having at least 5 carbon atoms attached to the amine nitrogen atom and at least 5 carbon atoms in one radical of the alcohol sulfate and the compound altogether contains at least 12 carbon atoms.

The examples have shown application of my invention to polystyrene, copolymers of vinyl chloride and vinyl acetate, cellulose acetate butyrate, polymethylmethacrylate and polyethylene. It should be clearly understood that this is illustrative and not limiting in any way as the invention is applicable to all resinous polymers capable of acquiring an electrostatic charge, such as, for example, cellulose acetate, polyamides, polyfluoroethylene, polyacrylonitrile, halogenated polystyrenes, polydivinylbenzenes, polystilbenes, polybutenes and rubber and copolymers of these chemical groups.

The method and conditions for carrying out the injection molding of the composition of my invention is not a subject of the invention and may be those of any molding procedure. Temperatures and cycle times given in the examples are purely illustrative. For example, polystyrene with amine salts, to which this invention relates, incorporated therein, may be molded at temperatures of 200° to 400° F. in a compression molding machine or in an injection molding machine with a mold temperature of 75° to 310° F.

While I generally do not favor the addition of other agents, and these are not essential to the invention, yet for some purposes I may include in the composition additional plasticizers, mold release agents and excipients or various types of surface active agents, pigments, dyes and the like. While certain specific concentrations of anti-electrostatic material have been employed, it is to be understood that I may employ the material in question in concentrations of from 0.1 percent to 10 percent although for best results, I prefer to employ at least about 0.4 percent of the agent stated, and quantities in excess of 3 percent do not generally serve any useful purpose as the maximum desired effect is obtained in this range.

While I do not wish to commit myself to any particular theory regarding the cause of the efficacy of the agent stated, it is my belief that the activity is that of electroisomeric adsorptive orientation and is not dependent on ionization or on electrical conductivity. Agents of very low conductivity, in fact having conductivity as poor as that of transformer oil, may have excellent anti-electrostatic efficacy.

It is thus apparent that the invention is broad in scope and is not to be restricted excepting by the claims in which it is my intention to claim all novelty inherent in the invention as broadly as possible in view of prior art. Having thus disclosed my invention, I claim:

1. A composition of matter comprising in combination a moldable synthetic resin and a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

2. A composition of matter comprising in combination polystyrene and a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

3. A composition of matter comprising in combination a moldable synthetic resin and 0.1 to 10.0 percent of a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

4. A composition of matter comprising in combination a moldable synthetic resin and 0.4 to 3.0 percent of a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

5. The process of producing a synthetic resin which is substantially non-susceptible to acquiring electrostatic charges which comprises applying to a resinous polymer a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

6. The process of producing a synthetic resin which is substantially non-susceptible to acquiring electrostatic charges which comprises applying to a resinous polymeric molding material a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

7. The process of producing a synthetic resin which is substantially non-susceptible to acquiring electrostatic charges which comprises applying to polystyrene a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

8. The process of producing a synthetic resin which is substantially non-susceptible to acquiring electrostatic charges which comprises applying to a resinous polymer 0.1 to 10.0 percent of a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

9. The process of producing a synthetic resin which is substantially non-susceptible to acquiring electrostatic charges which comprises applying to a resinous polymeric molding material 0.4 to 3.0 percent of a cycloaliphatic mono amine salt of an alcohol sulfate in which at least one alicyclic radical containing at least 5 carbon atoms is attached to the amine nitrogen atom and the alcohol radical of the alcohol sulfate has 5 carbon atoms and the compound altgether contains at least 12 carbon atoms.

10. The process of producing a synthetic resin which is substantially non-susceptible to acquiring electrostatic charges which comprises applying to polystyrene a cycloaliphatic mono amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

11. A synthetic resin composition essentially devoid of electrostatic susceptibility comprising in combination a resinous molding material consisting of a polyamide and a cycloaliphatic mono amine salt of an alcohol sulfate in which at least one alicyclic radical of at least 5 carbon atoms is attached to the amine nitrogen atom and the alcohol radical of the alcohol sulfate has at least 5 carbon atoms, so that the compound added to the resin has altogether at least 12 carbon atoms.

12. A thermoplastic synthetic resin, essentially devoid of electrostatic susceptibility, comprising in combination a copolymer of acrylonitrile and vinyl acetate and also a cycloaliphatic mono amine salt of an alcohol sulfate, wherein at least one alicyclic radical of at least 5 carbon atoms is attached to the amine nitrogen atom, and the alcohol radical of the alcohol sulfate has at least 5 carbon atoms, so that the compound added to the molding resin has altogether at least 12 carbon atoms.

13. A composition comprising a granular thermoplastic resinous material, and, distributed on the surface of said granules, a cycloaliphatic mono amine salt of an alcohol sulfate in which at least one alicyclic radical containing at least 5 carbon atoms is attached to the amine nitrogen atom, and the alcohol radical of the alcohol sulfate has at least 5 carbon atoms, and the compound altogether contains at least 12 carbon atoms, the amount of said surface distributed material being between 0.1 and 10.0 percent of said resinous material.

14. A substantially astatic article of manufacture, comprising a thermoplastic resinous material containing from 0.1 to 10.0 percent of a cycloaliphatic mono amine salt of an alcohol sulfate in which at least one alicyclic radical containing at least 5 carbon atoms is attached to the amine nitrogen atom, and the alcohol radical of the alcohol sulfate has at least 5 carbon atoms, and the compound altogether contains at least 12 carbon atoms, the amount of said surface distributed material being between 0.1 and 10.0 percent of said resinous material.

JOHN B. EISEN.

REFERENCES CITED

The following references are of record in the file of this patent:

UNITED STATES PATENTS

| Number | Name | Date |
| --- | --- | --- |
| 2,267,685 | Kyrides | Dec. 23, 1941 |